US 6,467,360 B1

(12) United States Patent
Bogdanov (10) Patent No.: US 6,467,360 B1
(45) Date of Patent: Oct. 22, 2002

(54) TORQUE SENSING APPARATUS AND METHOD

(75) Inventor: Leonid Bogdanov, Troy, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/299,111

(22) Filed: Apr. 23, 1999

(51) Int. Cl.$^7$ .............................. G01L 3/02; G01L 3/10; G01L 3/12; G01L 3/14
(52) U.S. Cl. .............................. 73/862.333; 73/862.336
(58) Field of Search ...................... 73/862.331–862.336

(56) References Cited

U.S. PATENT DOCUMENTS

| 4,414,855 A | | 11/1983 | Iwasaki | |
|---|---|---|---|---|
| 4,416,161 A | | 11/1983 | Barkhoudarian | |
| 4,882,936 A | | 11/1989 | Garshelis | |
| 4,896,544 A | | 1/1990 | Garshelis | |
| 4,907,462 A | | 3/1990 | Obama et al. | |
| 4,972,728 A | * | 11/1990 | Yoshimura et al. | 73/862.36 |
| 4,989,460 A | | 2/1991 | Mizuno et al. | |
| 5,052,232 A | * | 10/1991 | Garshelis | 73/862.36 |
| 5,131,281 A | * | 7/1992 | Utsui et al. | 73/862.36 |
| RE34,039 E | | 8/1992 | Kobayashi et al. | |
| 5,146,790 A | | 9/1992 | Fish | |
| 5,351,555 A | | 10/1994 | Garshelis | |
| 5,394,760 A | * | 3/1995 | Persson et al. | 73/862.331 |
| 5,431,063 A | * | 7/1995 | Yasui | 73/779 |
| 5,442,966 A | | 8/1995 | Hase et al. | |
| 5,591,925 A | * | 1/1997 | Garshelis | 73/862.335 |
| 5,752,208 A | * | 5/1998 | Lerner | 701/41 |
| 6,222,363 B1 | * | 4/2001 | Cripe | 324/225 |
| 6,301,976 B1 | * | 10/2001 | Bodganov | 73/862.333 |

FOREIGN PATENT DOCUMENTS

| EP | 0525551 | 2/1993 |
|---|---|---|
| EP | 1037029 | 9/2000 |

* cited by examiner

Primary Examiner—Benjamin R. Fuller
Assistant Examiner—Lilybett Martir
(74) Attorney, Agent, or Firm—Tarolli, Sundheim, Covell, Tummino & Szabo L.L.P.

(57) ABSTRACT

The present invention is directed to a torque sensing apparatus (10) for sensing torque applied to an elongated shaft (12) having a longitudinal axis (14). An elongated magnetoelastic element (16) is connected about a portion of the shaft (12). The magnetoelastic element (16) provides a magnetic field in response to a torque (T) applied to the shaft (12). A magnetic member (28) is positioned adjacent the magnetoelastic element (16). An alternating power source (34) drives the magnetic member (28) into magnetic saturation. The magnetic member (28) has a saturation condition responsive to the magnetic field of the magnetoelastic element (16). A detector circuit (36) detects the saturation condition of the magnetic member. The detector circuit (36) provides a signal indicative of the applied torque in response to the saturation condition of the magnetic member (28).

19 Claims, 3 Drawing Sheets

TORQUE SENSING APPARATUS AND METHOD

TECHNICAL FIELD

The present invention relates to a method and apparatus for sensing torque, and more particularly to a torque sensing apparatus and method for measuring torque in response to a saturation condition of a magnetic member.

BACKGROUND OF THE INVENTION

Numerous torque sensing systems have magnetoelastic rings secured to a rotatable shaft. When torque is applied about a longitudinal axis of the shaft, the torsional stress of the shaft is transferred to the magnetoelastic ring. The torsional stress changes the magnetic permeability of the magnetoelastic ring, typically in an axial direction. The ring also provides a corresponding magnetic field. Many conventional torque sensing devices use sensor coils or integrated circuit sensors to detect the magnetic field or magnetic permeability of the ring. The sensors typically detect a change in impedance or a change in an induced voltage of sensor components according to the magnetic field provided by the ring. The amount of applied torque is determined in response to such changes detected by the sensor.

SUMMARY OF THE INVENTION

The present invention is directed to a torque sensing apparatus for sensing torque applied to an elongated shaft having a longitudinal axis. A magnetoelastic element is connected to a portion of the shaft. The magnetoelastic element provides a magnetic field in response to torque applied to the shaft. A magnetic member is positioned adjacent the magnetoelastic element. A source of alternating power repeatedly drives the magnetic member into magnetic saturation. The magnetic member has a saturation condition responsive to the magnetic field of the magnetoelastic element. A detector circuit detects the saturation condition of the magnetic member. The detector circuit provides a signal indicative of the applied torque in response to the saturation condition of the magnetic member.

Another aspect of the present invention is directed to a method for determining torque applied to an elongated shaft. The method includes the step of repeatedly driving a magnetic member into magnetic saturation. A magnetoelastic element is attached to the shaft. The method further includes providing a magnetic field in response to torque applied to the shaft. The magnetic member has a saturation condition responsive to the magnetic field. A signal indicative of the applied torque is provided in response to the saturation condition of the magnetic member.

BRIEF DESCRIPTION OF THE DRAWINGS

The foregoing and other features of the invention will become more apparent to one skilled in the art upon consideration of the following description of the invention and the accompanying drawings in which.

DESCRIPTION OF PREFERRED EMBODIMENTS

Figure 1:
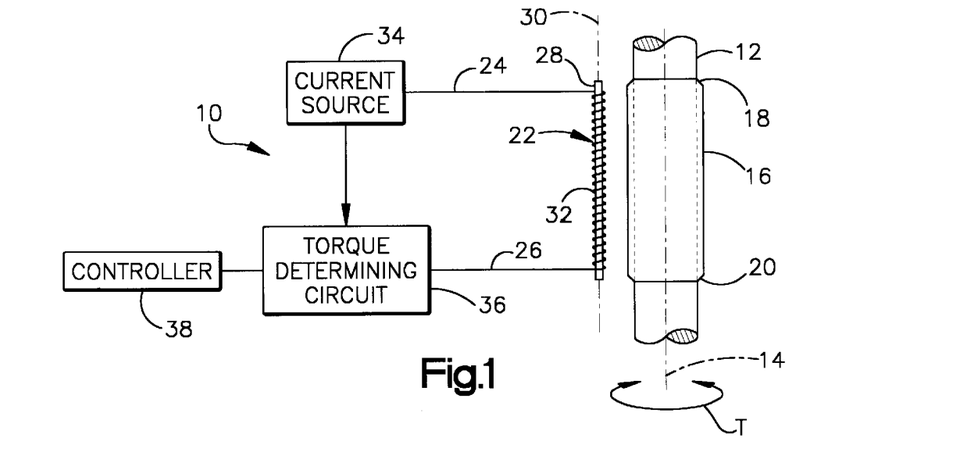
FIG. 1 is a schematic representation of a torque sensing apparatus in accordance with the present invention.

FIG. 1 schematically illustrates an embodiment of a torque sensing apparatus, indicated at 10, in accordance with the present invention. The torque sensing apparatus 10 includes an elongated shaft 12 having a longitudinal axis 14. The shaft 12 has a fixed end and a free end (not shown), such that the shaft 12 experiences torsion in response to an applied torque, indicated at T. The shaft 12 is formed of a generally rigid and resilient material, preferably having a low magnetic permeability.

An elongated magnetoelastic element 16, which may be a cylindrical tubular sleeve, is connected about a portion of the shaft 12. The magnetoelastic element 16 may be press-fit, welded, or otherwise secured to the outer surface of the shaft 12, such that there is no slip between the element 16 and the shaft 12. The magnetoelastic element 16 is coaxial with and circumscribes the shaft 12. Preferably, the magnetoelastic element 16 has frustoconical end portions 18 and 20, which are chamfered at an angle of about 42°–48° from a plane extending perpendicular to the shaft axis 14.

The magnetoelastic element 16 is formed of a magnetic anisotropic material, such as, for example, a maraging steel material. The magnetoelastic element 16 is magnetically polarized in a predetermined circumferential direction about the shaft axis 14. The torsion of the shaft 12 due to the torque T is transferred to the magnetoelastic element 16. The magnetoelastic element 16 provides an axial magnetic field in response to the applied torque T essentially proportional to a change in its magnetic permeability. The torque-responsive field has flux lines (not shown) extending between the end portions 18 and 20 of the magnetoelastic element 16.

A first magnetic assembly, indicated at 22, is positioned adjacent the magnetoelastic element 16. The magnetic assembly 22 has an input 24 and an output 26. The axial magnetic field of the magnetoelastic element 16 acts upon the magnetic assembly 22 according to the applied torque T. The magnetic assembly 22 senses and is responsive to the magnetic field of the magnetoelastic element 16.

As shown in FIG. 1, the magnetic assembly 22 preferably is formed of a magnetic member, illustrated as an elongated core 28 of a magnetic material. The core 28, for example, may be formed of a paramagnetic material, a ferromagnetic material, a ferrimagnetic material, a superparamagnetic material or any material having a suitable magnetic behavior. Preferably, the core is formed of a cast amorphous wire of ferromagnetic material. The length of the core 28 corresponds to the length of the magnetoelastic element 16, with the core 28 being positioned coextensive thereto. The core 28 has a longitudinal axis 30 parallel to the shaft axis 14. The core axis 30 is spaced a predetermined distance from the outer surface of the magnetoelastic element 16. Preferably, the distance between the magnetoelastic element 16 and the core axis 30 ranges from about 1.0 mm to about 1.75 mm. The magnetic assembly 22, and more specifically the core 28, has a saturation condition which changes in response to the applied torque T.

The magnetic assembly 22 also includes an elongated wire having a plurality of coil windings 32, suitably greater than about 200 circumferential windings, wound around the core 28 as a plurality of overlapping layers. One end of the wire forms the input 24 of the magnetic assembly 22 and the other end of the wire forms the output 26. The wire is formed of an electrically conducting material, suitably a copper wire.

An alternating source of power, preferably a current source 34, provides current to the input 24 of the magnetic assembly 22. The current in the coil windings 32 repeatedly drives the core 28 into positive and negative magnetic saturation, namely into saturation hysterisis. A current source is preferred as it facilitates controlling the saturation condition of the core 28.

Figure 2:
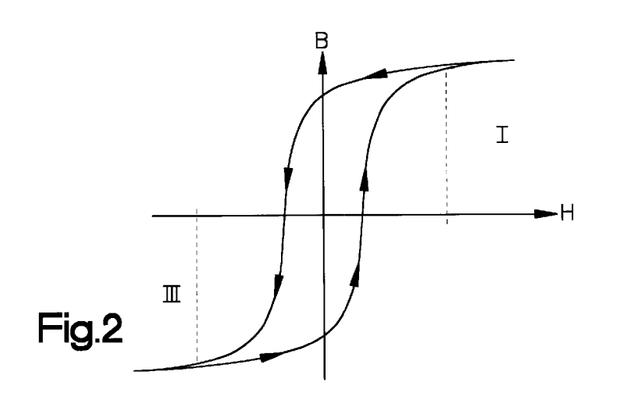
FIG. 2 is a representation of a hysteresis curve showing operational characteristics of the apparatus of FIG. 1.

A representation of a saturation hysteresis loop for the magnetic core 28 is shown in FIG. 2. The width of the hysteresis loop depends on how easily the core 28 is magnetized. For example, easily magnetized materials have a thin hysteresis loop, while the hysteresis loop of a hard magnetic material encloses a greater area and, thus, has a greater width. The magnetic flux density (B) is shown as a function of the magnetic field (H). The phenomenon of hysteresis causes B to lag behind H, so that the magnetization curve for increasing and decreasing magnetic fields is not the same. At positive saturation in zone I, B essentially does not change in response to an increase in H. Similarly, B essentially does not change in response to a decrease in H at negative saturation in zone III.

At saturation, essentially all the atomic dipoles of the core 28 align with the magnetic field being applied, such that the core 28 is thus magnetized to a maximum extent. In addition, the magnetic permeability of the material approaches zero at saturation. Advantageously, driving the core 28 to saturation essentially eliminates the external effects, such as temperature and stresses, which otherwise affect the permeability of the core 28.

Figure 3A:
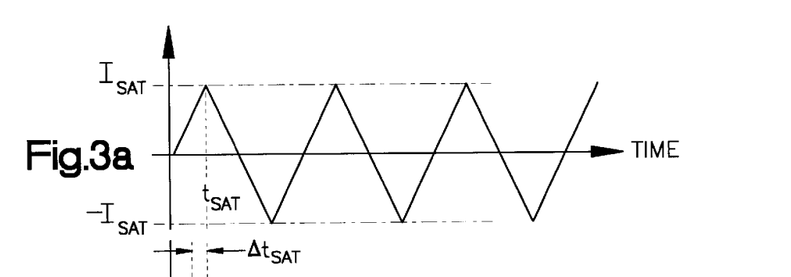
FIG. 3a is a representation of current versus time for an input current to the apparatus of FIG. 1.

Referring to FIGS. 1 and 3A, the alternating current source 34 preferably provides a saw-tooth wave of alternating current to the input 24. The current source 34 supplies current at a predetermined frequency. The frequency should be substantially faster than the rate at which torque will be applied, suitably about 20 kHz. When no torque is applied to the shaft 12, current at the output 26 of the magnetic assembly is essentially equal to current at the input at 24. The saturation characteristics of the core 28 are known. Accordingly, the amplitude of the current source 34 is controlled to saturate the core 28 at about its maximum and minimum currents, indicated at $I_{SAT}$ and at $-I_{SAT}$. Specifically, the maximum current $I_{SAT}$ saturates the core 28 at a time indicated at $t_{SAT}$.

It will be understood by those skilled in the art that other types of alternating currents may also be used, such as, for example, a sign wave, a square wave or any other alternating current. It further will be understood that other types of power sources, such as an external magnetic field or a voltage source, may be used to drive the core 28 into magnetic saturation.

Figure 3B:
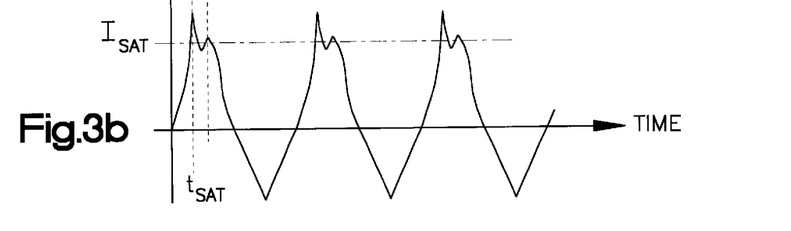
FIG. 3b is a representation of current versus time for an output current in response to a torque applied to the apparatus of FIG. 1.

When the torque T is applied, the magnetoelastic element 16 provides a magnetic field that acts upon the magnetic assembly 22 and, more particularly, upon its associated core 28. The magnetic field due to the applied torque T, plus the current through the coil windings 32, causes the core 28 to saturate more quickly than when only the current is applied. Referring to FIG. 3B, the application of the torque T in a clockwise direction, for example, results in a current spike in the output current. This causes the core 28 to saturate at a time indicated at $t_{SAT}$. This corresponds to positive saturation, such as in zone I of FIG. 2. The time difference between reaching saturation when no torque is applied and when torque is applied is indicated at $\Delta t_{SAT}$. The $\Delta t_{SAT}$ value is functionally related to the amount of torque applied. Similarly, torque applied in the opposite direction, or counterclockwise, results in a negative current spike (not shown) at the output 26 of the magnetic assembly 22 as the input current approaches $I_{SAT}$. The counterclockwise torque thus facilitates reaching negative saturation more quickly, such as shown in Zone III of FIG. 2.

A torque determining circuit 36 is coupled to the output 26 of the magnetic assembly 22 for detecting the saturation condition of the magnetic assembly 22. In the embodiment of FIG. 1, the torque determining circuit 36 detects the output current of the coil windings 32. The torque determining circuit 36 also is coupled to the current source 34. Accordingly, the circuit 36 senses the input current provided to the input 24 of the magnetic assembly 22. It also may provide feedback to control the input current. The torque determining circuit 36 compares the current at the input 24 of the magnetic assembly 22 with the current at the output 26 of the magnetic assembly 22 to determine a change in the saturation condition of the magnetic assembly 22.

The saturation characteristics of the core 28 may be determined empirically through testing and stored in the torque determining circuit 36. The amplitude of the input current is selected to drive the core 28 into saturation at about its maximum and minimum amplitudes in the absence of an applied torque. The time at which saturation is reached when no applied torque essentially corresponds to the peaks of the alternating currents, indicated at $I_{SAT}$ and $-I_{SAT}$ in FIG. 3A. Therefore, a measure of the torque T may be determined in response to how much more quickly the core 28 reaches positive or negative magnetic saturation when the torque T is applied. This is indicated at $\Delta t_{SAT}$ in FIG. 3B. The torque determining circuit 36 provides a signal indicative of the applied torque T in response to the detected saturation condition of the magnetic assembly 28. The torque signal is supplied to a controller 38 for controlling desired components, such as described in greater detail below.

Figure 4:
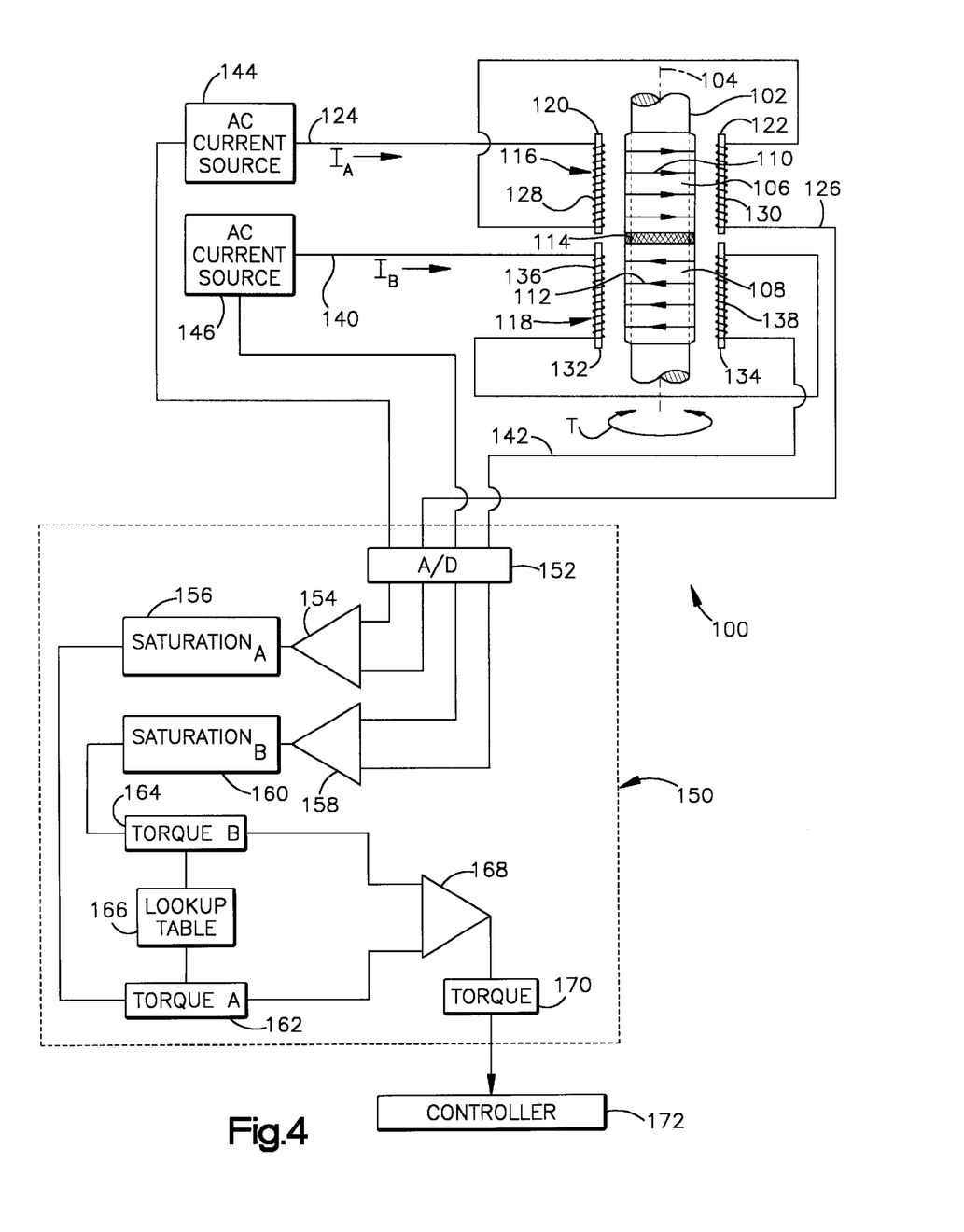
FIG. 4 is another embodiment of a torque sensing apparatus in accordance with the present invention.

Another embodiment of a torque sensing apparatus, indicated at 100, is illustrated in FIG. 4. This embodiment includes an elongated shaft 102 having a longitudinal axis 104. A torque, indicated at T, may be applied to the shaft 102 about its axis 104 in a clockwise or counterclockwise direction. A pair of elongated magnetoelastic elements 106 and 108 are secured about the shaft 102. The magnetoelastic elements 106 and 108 are formed of magnetic anisotropic materials, such as maraging steel. The first magnetoelastic element 106 is magnetically polarized in a first circumferential direction, indicated at 110. The other magnetoelastic element 108 is magnetically polarized in an opposite circumferential direction indicated at 112. The magnetoelastic elements 106 and 108 preferably are spaced axially apart by an insulating spacer material 114.

A magnetic assembly 116 and 118 is associated with each respective magnetoelastic element 106 and 108. The magnetic assembly 116 illustrated in FIG. 4 includes a pair of diametrically opposed magnetic cores 120 and 122. The cores 120 and 122 are positioned adjacent and coextensive the magnetoelastic element 106. An elongated electrically conducting wire having an input 124 and an output 126 is wound around each core 120 and 122 to form respective coil windings 128 and 130 connected in series. The coil windings 128 suitably are wound in a plurality of overlapping layers between the ends of each core 120 and 122.

Similarly, the magnetic assembly 118 includes diametrically opposed magnetic cores 132 and 134 positioned adjacent and coextensive the magnetoelastic element 108. The magnetic assembly 118 also includes a plurality of coil windings 136 and 138 wound around each respective core 132 and 134 as a plurality of overlapping layers of the wire. As shown in FIG. 4, the coil windings 136 and 138 are formed of a common wire connected in series. The input of the coil windings 136 forms an input 140 of the magnetic assembly 118. The output of the coil windings 136 is connected to the input of the coil windings 138 and the output of the coil windings 138 forms an output 142 of the magnetic assembly 118.

Each magnetic assembly 116 and 118 is excited by a source of alternating power to drive the cores 120 and 122 and 132 and 134 of each respective assembly repeatedly into positive and negative saturation. Preferably, a pair of alternating current sources 144 and 146 provide input currents $I_A$ and $I_B$, respectively, to the inputs 124 and 140. Each alternating current source may be powered by a common AC power source, such as a square wave voltage source having a predetermined frequency, although other power sources may suffice. As stated with respect to FIG. 1, each alternating current source 144 and 146 preferably provides a sawtooth wave current having a predetermined frequency, suitably about 20 kHz, and a predetermined amplitude. The currents $I_A$ and $I_B$ are selected to drive each respective magnetic assembly 116 and 118 into magnetic saturation at substantially their minimum and maximum amplitudes. The saturation condition of each magnetic assembly 116 and 118, and more particularly the respective cores 120 and 122 and the cores 132 and 134, changes in response to the applied torque T. Specifically, the cores 120 and 122 saturate at different input current levels and, thus, at different times when the torque T is applied.

A torque determining circuit, indicated at 150, is electrically coupled to the output 126 of the first magnetic assembly 116 and to the output 142 of the second magnetic assembly 118. The torque determining circuit 150 also is coupled to each AC current source 144 and 146. The connection to the current sources 144 and 146 provides the conditioning circuit 150 signals indicative of the input current. The torque determining circuit 150 also may provide feedback to the current sources 144 and 146 to control the frequency and/or amplitude of the respective input currents $I_A$ and $I_B$. The torque determining circuit 150 preferably includes a microcomputer configured to determine the applied torque T in response to the changes in the saturation conditions of the first and second magnetic assemblies 116 and 118. The torque determining circuit 150 also may comprise an integrated circuit, discrete components or a combination of integrated circuits and discrete components configured to perform the desired detection and signal processing functions.

The elements within the torque determining block 150 diagrammatically illustrate an overview of the function performed by the torque determining circuit 150. The signals input to the torque determining circuit 150 are appropriately digitized by one or more analog-to-digital (A/D) converters 152. The A/D converters 152 may be positioned external to the circuit 150, instead of within the circuit 150 as shown. The signals also should be filtered, suitably by appropriate digital or analog filters (not shown), to remove frequency components not desirable in determining the applied torque T.

The digitized signal at the output 126 of the magnetic assembly 116 is compared with the input current $I_A$ from the current source 144 in a comparison function 154. The signal from the comparison function 154 is provided to a saturation determining function 156 for channel A. The saturation determining function 156 determines a change in saturation condition of the magnetic assembly 116 in response to the applied torque T. The change in saturation conditions of the cores 120 and 122 results in a corresponding change in the detected output current, such as a current spike at saturation, in response to the magnetic field provided by the magnetoelastic element 106. The saturation determining function 156 for channel A determines the time difference between when the cores 120 and 122 of the magnetic assembly 116 reach magnetic saturation in response to the applied torque T and when they reach saturation as no torque is applied. This corresponds to the $\Delta t_{SAT}$ shown and described with respect to FIG. 3b. If no torque is applied, the saturation determining function 156 will indicate that there is no change in the saturation condition.

Another comparison function 158 compares the digitized signal of the output 142 of the magnetic assembly 118 with the input current $I_B$. The output of the comparison function 158 is provided to another saturation determining function 160 for channel B. The saturation determining function 160 determines a change in the saturation condition of the magnetic assembly 118. Specifically, the saturation determining function 160 determines the time difference between when the cores 132 and 134 reach magnetic saturation due to the magnetic field provided by the magnetoelastic element 108 in response to the applied torque T and when they reach saturation as no torque is applied.

The outputs of the saturation determining functions 156 and 160 are provided to respective torque determining functions 162 and 164. A lookup table 166 of the torque determining circuit 150 provides a measure of torque for a plurality of saturation conditions. The corresponding measures of torque for the various saturation conditions may be determined by empirical testing and stored in the look-up table 166.

The torque determining function 162 for channel A determines a measure of the applied torque T in response to the change in the saturation condition of the magnetic assembly 116 according to the contents of the lookup table 166. Similarly, the torque determining function 164 for channel B determines a measure of the applied torque T in response to the change in the saturation condition of the magnetic assembly 118. Because the magnetoelastic elements 106 and 108 are oppositely polarized, the measures of torque from the associated magnetic assemblies 116 and 118 are essentially opposite or are differential signals. The differential torque signals are compared and averaged in functional block 168 to determine a measure of the applied torque T, including its angular direction. The functional block 168 provides an output signal indicative of the magnitude and direction of the applied torque T, indicated at functional block 170. The circuit 150 provides the torque signal to an input of an appropriate controller 172.

Figure 5:
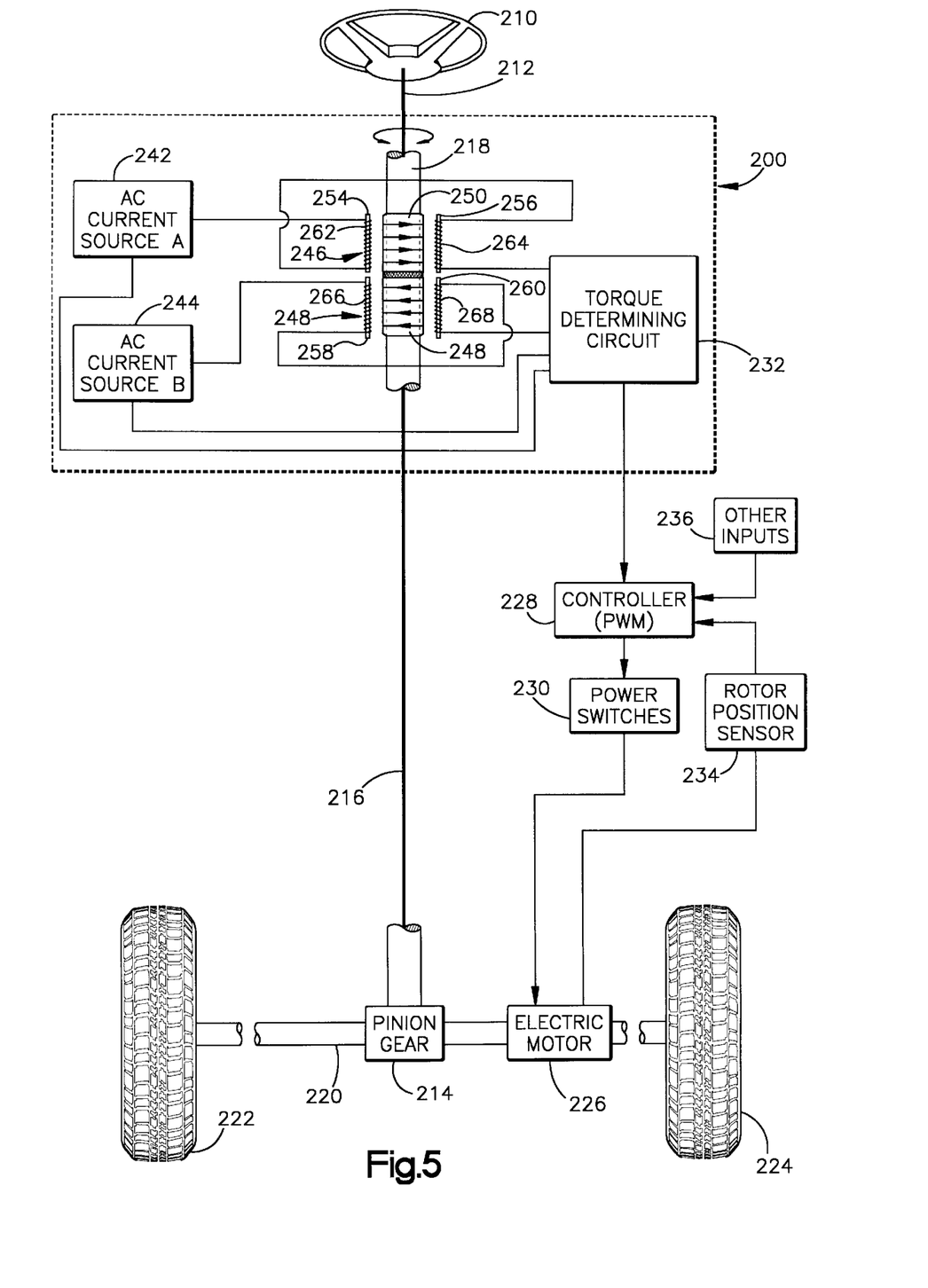
FIG. 5 is a schematic representation of an embodiment of a torque sensing apparatus in combination with a steering system in accordance with the present invention.

Referring to FIG. 5, a preferred embodiment of a torque sensing apparatus, indicated at 200, is illustrated schematically in combination with a steering system of a vehicle. A hand steering wheel 210 is connected to an input shaft 212. A pinion gear 214 is connected to an output shaft 216. The input shaft 212 is operatively coupled to the output shaft 216 through a torsion bar 218. The torsion bar 218 corresponds to the shaft previously described with respect to FIGS. 1 and 4. The torsion bar 218 twists in response to applied steering torque, indicated at T, thereby permitting relative rotation between the input shaft 212 and the output shaft 216. The torsion bar 218 has a predetermined spring constant. The amount of relative rotation between the input shaft 212 and the output shaft 216, in response to the applied steering torque T, is functionally related to the spring constant of the torsion bar 218. The pinion gear 214 meshingly engages rack teeth disposed on a steering rack member 220. The steering rack member 220 is connected to steerable wheels 222 and 224 of the vehicle in a known manner. Rotation of the hand steering wheel 210 causes steering movement of the wheels 222 and 224.

The steering system also includes an electric motor 226 that circumscribes the steering rack member 220. Preferably, the electric motor 226 is a variable reluctance motor, although other types of motors also may be used. The electric motor 226 is drivingly connected to the steering rack member 220, such as by a ball-nut drive assembly (not shown). An acceptable ball-nut drive assembly is shown and described in U.S. Pat. No. 4,415,054 to Drutchas. Other drive assemblies also may be used. The electric motor 226 provides an auxiliary steering force under certain vehicle conditions.

The electric motor 226 is connected to a motor control circuit 228 through a bank of power switches 230. The switches 230 are pulse-width-modulated in a known manner by the controller 228. The pulse-width-modulation from the controller 228 provides current to the motor 226 according to the direction and amount of auxiliary steering force required. The controller 228 is coupled to a torque determining circuit 232. The torque determining circuit 232 provides a torque signal to the controller 228 indicative of the magnitude and direction of the applied steering torque T. In addition, the motor controller 228 is coupled to a rotor position sensor 234 that senses the position of the rotor of the variable reluctance electric motor 226. The rotor position sensor 234 provides a signal indicative of the rotor position. The controller 228 also receives other inputs, indicated at 236. The other inputs 236 may include, for example, vehicle speed, temperature of the electric motor 26 as well as soft start control circuitry. In response to the inputs, which include the torque signal, the rotor position signal, and the other inputs, the controller 228 controls the electric motor 226 to assist in the rotation of the wheels 222 and 224.

The torque detection circuit 200 is shown to be configured in a manner set forth above. A pair of alternating current sources 242 and 244 repeatedly drive a pair of magnetic assemblies 246 and 248 to and from positive and negative magnetic saturation, namely into saturation hysteresis. A pair of magnetoelastic elements 250 and 252 are secured along the torsion bar 218. As the torsion bar 218 twists in response to the applied torque T, the torsion is transferred essentially equally to each magnetoelastic element 250 and 252. The magnetoelastic elements 250 and 252 are polarized in opposite circumferential directions. Accordingly, upon application of the torque T, the magnetoelastic elements 250 and 252 provide an axial magnetic field, with flux lines traveling in essentially opposite directions.

The magnetic assembles 246 and 248 are positioned adjacent and coextensive to each respective magnetoelastic element 250 and 252. Each magnetic assembly 246 and 248 is formed of a pair of diametrically opposed magnetic core members 254, 256 and 258, 260 and associated coil windings 262, 264 and 266, 268, respectively. The magnetic assemblies 246 and 248, and more specifically the respective core members 254, 256 and 258, 260, have predetermined saturation conditions. The saturation conditions of each respective magnetic assembly 252 and 254 change in response to the magnetic fields produced by magnetoelastic elements 246 and 248 as the torque T is applied. The torque determining circuit 232 determines the magnitude and direction of the applied torque T in response to the changes in the saturation conditions of the magnetic assemblies 246 and 248, such as described above. The torque determining circuit 232 provides the torque signal to the controller 228. The controller 228 causes the electric motor 226 to aid in rotation of the wheels 222 and 224 in response to the steering torque T caused by rotation of the hand steering wheel 210.

From the above description of the invention, those skilled in the art will perceive improvements, changes and modifications. Such improvements, changes and modifications within the skill of the art are intended to be covered by the appended claims.

Having described the invention, the following is claimed:

1. A torque sensor for sensing torque applied to an elongated magnetized member having a longitudinal axis, said torque sensor comprising:

a first magnetic assembly having an input and an output, said elongated magnetized first magnetic assembly positioned adjacent said member;

a current source providing current to said input of said first magnetic assembly, said first magnetic assembly having a first saturation condition in response to said current, said first magnetic assembly having a second saturation condition in response to both said applied torque and said current; and a detector circuit coupled to said output of said first magnetic assembly, said detector circuit providing a signal indicative of said applied torque in response to said second saturation condition of said first magnetic assembly, said detector circuit comparing current at said input of said magnetic assembly with current at said output of said magnetic assembly to determine a change between said first and second saturation conditions of said first magnetic assembly.

2. The sensor of claim 1 wherein said change between said first and second saturation conditions is indicative of said applied torque.

3. A torque sensor for sensing torque applied to an elongated magnetized member having a longitudinal axis, said torque sensor comprising:

a first magnetic assembly having an input and an output, said first magnetic assembly positioned adjacent magnetized said member;

a current source providing current to said input of said first magnetic assembly, said first magnetic assembly having a first saturation condition in response to said current, said first magnetic assembly having a second saturation condition in response to both said applied torque and said current; and a detector circuit coupled to said output of said first magnetic assembly, said detector circuit providing a signal indicative of said applied torque in response to said second saturation condition of said first magnetic assembly, said magnetized member comprising a first magnetoelastic element connected about a portion of a shaft, said first magnetoelastic element providing a magnetic field in response to torque applied to said shaft, a second magnetoelastic element attached about a portion of said shaft adjacent said first magnetoelastic element, said second magnetoelastic element providing a magnetic field in response to said applied torque;

a second magnetic assembly having an input and an output, said second magnetic assembly positioned adjacent said second magnetoelastic element;

a second current source providing current to said input of said second magnetic assembly, said second magnetic assembly having a third saturation condition in response to said current of said second current source, said second magnetic assembly having a fourth saturation condition in response to both said applied torque and said current of said second current source; and said detector circuit coupled to said output of said second magnetic assembly, said detector circuit providing a signal indicative of said applied torque in response to said second and fourth saturation conditions of said respective first and second magnetic assemblies, said detector circuit comprising said saturation conditions of said first and second magnetic assemblies to provide a signal indicative of the magnitude and angular direction of said applied torque.

4. A torque sensor for sensing torque applied to an elongated magnetized member having a longitudinal axis, said torque sensor comprising:

a first magnetic assembly having an input and an output, said first magnetic assembly positioned adjacent magnetized said member;

a current source providing current to said input of said first magnetic assembly, said first magnetic assembly having a first saturation condition in response to said current, said first magnetic assembly having a second saturation condition in response to both said applied torque and said current; and a detector circuit coupled to said output of said first magnetic assembly, said detector circuit providing a signal indicative of said applied torque in response to said second saturation condition of said first magnetic assembly, said magnetized member comprising a first magnetoelastic element connected about a portion of a shaft, said first magnetoelastic element providing a magnetic field in response to torque applied to said shaft, a second magnetoelastic element attached about a portion of said shaft adjacent said first magnetoelastic element, said second magnetoelastic element providing a magnetic field in response to said applied torque;

a second magnetic assembly having an input and an output, said second magnetic assembly positioned adjacent said second magnetoelastic element;

a second current source providing current to said input of said second magnetic assembly, said second magnetic assembly having a third saturation condition in response to said current of said second current source, said second magnetic assembly having a fourth saturation condition in response to both said applied torque and said current of said second current source; and said detector circuit coupled to said output of said second magnetic assembly, said detector circuit providing a signal indicative of said applied torque in response to said second and fourth saturation conditions of said respective first and second magnetic assemblies, each of said first and second magnetic assemblies further comprising first and second magnetic members positioned adjacent and on substantially opposite sides of said first and second magnetoelastic elements respectively.

5. The system of claim 4 wherein said first and second magnetic members are electrically connected between said input and said output of each of said first and second magnetic assemblies, each of said first and second magnetic members having a first saturation condition in response to said current and a second saturation condition in response to both said applied torque and said current, said detector circuit providing a signal indicative of said applied torque in response to said second saturation condition of said first and second magnetic members.

6. A torque sensing apparatus for sensing torque applied to an elongated magnetized member having a longitudinal axis, said apparatus comprising:

a first magnetic assembly positioned adjacent magnetized said member;

an alternating power source repeatedly driving said first magnetic assembly into magnetic saturation, said first magnetic assembly having a first saturation condition responsive to said magnetic field of said member; and a detector circuit detecting said first saturation condition of said first magnetic assembly, said detector circuit providing a signal indicative of said applied torque in response to said first saturation condition of said first magnetic assembly, said first magnetic assembly comprising an elongated core of a ferromagnetic material positioned adjacent and coextensive said member, said core having a saturation condition responsive to said magnetic field of said member.

7. The apparatus of claim 6 further comprising an elongated wire having first and second ends and a plurality of windings being wound around said core intermediate said first and second ends of said wire, said power source providing an alternating current to said first end of said wire, thereby repeatedly driving said core into magnetic saturation, and said detector circuit coupled to said second end of said wire for determining said applied torque in response to said saturation condition of said core.

8. A torque sensing apparatus for sensing torque applied to an elongated magnetized member having a longitudinal axis, said apparatus comprising:

a first magnetic assembly positioned adjacent said magnetized member;

an alternating power source repeatedly driving said first magnetic assembly into magnetic saturation, said first magnetic assembly having a first saturation condition responsive to said magnetic field of said member; and a detector circuit detecting said first saturation condition of said first magnetic assembly, said detector circuit providing a signal indicative of said applied torque in response to said first saturation condition of said first magnetic assembly, said magnetized member comprising a first magnetoelastic element connected about a portion of a shaft, said first magnetoelastic element providing a magnetic field in response to torque applied to said shaft, a second magnetoelastic element attached to a portion of said shaft adjacent said first magnetoelastic element, said second magnetoelastic element providing a magnetic field in response to said applied torque;

a second magnetic assembly positioned adjacent said second magnetoelastic element;

said power source repeatedly driving said second magnetic assembly into magnetic saturation, said second magnetic assembly having a second saturation condition responsive to said magnetic field of said second magnetoelastic element; and said detector circuit providing a signal indicative of said applied torque in response to said first and second saturation conditions of said respective first and second magnetic assemblies, each of said first and second magnetic assemblies further comprising first and second elongated cores of a ferromagnetic material positioned adjacent and along opposed sides of said first and second magnetoelastic elements respectively, each of said cores having a saturation condition responsive to each of said magnetic fields of each of said first and second magnetoelastic elements respectively.

9. The apparatus of claim 8 wherein said detector circuit provides a signal indicative of said applied torque in response to said saturation condition of said respective cores.

10. A torque sensor for sensing torque applied to an elongated magnetized member having a longitudinal axis, said torque sensor comprising:

a first magnetic assembly having an input and an output, said first magnetic assembly being positioned adjacent said elongated magnetized member;

a current source providing current to said input of said first magnetic assembly, said first magnetic assembly, in an absence of torque applied to said elongated magnetized member, being driven to a first saturation condition by said current provided by said current source, said first magnetic assembly being driven to a second saturation condition, which is different from said first saturation condition, in response to both said current provided by said current source and a torque applied to the elongated magnetized member; and a detector coupled to said output of said first magnetic assembly for sensing said first and second saturation conditions of said first magnetic assembly and for determining said torque applied to said elongated magnetized member, said torque being functionally related to a difference between said first and second saturation conditions.

11. The sensor of claim 10 wherein said elongated magnetized member comprises a first magnetoelastic element connected about a portion of a shaft.

12. The sensor of claim 11 further comprising:

a second magnetoelastic element attached about a portion of said shaft adjacent said first magnetoelastic element, said second magnetoelastic element providing a magnetic field having a circumferentially extending polarity, torsion of said second magnetoelastic element, in response to torque applied to said shaft, producing an axial component of said magnetic field;

a second magnetic assembly having an input and an output, said second magnetic assembly positioned adjacent said second magnetoelastic element;

a second current source providing current to said input of said second magnetic assembly, said second magnetic assembly, in an absence of torque applied to said shaft, being driven to a third saturation condition by said current of said second current source, said second magnetic assembly being driven to a fourth saturation condition, which is different from the third saturation condition, in response to both said current provided by said second current source and said torque applied to said shaft; and said detector including a detector circuit coupled to said output of said second magnetic assembly for sensing said third and fourth saturation conditions of said second magnetic assembly and for determining said torque applied to said shaft, said torque being functionally related to a difference between said third and fourth saturation conditions.

13. The sensor of claim 12 wherein said detector circuit compares the difference of said first and second saturation conditions of said first magnetic assembly to the difference of said third and fourth saturation conditions of said second magnetic assembly in determining a magnitude and angular direction of said torque applied to said shaft.

14. The sensor of claim 12 wherein said first magnetoelastic element is magnetically polarized in a first circumferential direction, and said second magnetoelastic element is magnetically polarized in a circumferential direction opposite said first circumferential direction.

15. The sensor of claim 10 wherein said elongated magnetized member is formed from magnetic anisotropic material, said elongated magnetized member providing a magnetic field having a circumferentially extending polarity, torsion of said elongated magnetized member, in response to torque applied to said elongated magnetized member, producing an axial component of said magnetic field.

16. The sensor of claim 15 wherein said axial component of said magnetic field of said elongated magnetized member acts upon said first magnetic assembly to drive said first magnetic assembly toward said second saturation condition.

17. The sensor of claim 15 wherein said axial component of said magnetic field increases as a function of the torque applied to the elongated magnetized member.

18. The sensor of claim 10 in combination with a steering assist system, said combination comprising:

a controller operatively connected to said detector for providing a control signal in response to said detector signal; and steering assist means for providing steering assist in response to said control signal.

19. The sensor of claim 10 wherein said first magnetic assembly is positioned adjacent a first portion of said elongated magnetized member and wherein said sensor further comprises:

a second magnetic assembly having an input and an output, said second magnetic assembly positioned adjacent a second portion of said elongated magnetized member;

a second current source providing current to said input of said second magnetic assembly, said second magnetic assembly, in an absence of torque applied to said elongated magnetized member, being driven to a third saturation condition by,said current of said second current source, said second magnetic assembly being driven to a fourth saturation condition, which is different from the third saturation condition, in response to both said current provided by said second current source and said torque applied to said elongated magnetized member; and said detector including a detector circuit coupled to said output of said second magnetic assembly for sensing said third and fourth saturation conditions of said second magnetic assembly and for determining said torque applied to said elongated magnetized member, said torque being functionally related to a difference between said third and fourth saturation conditions.

* * * * *

UNITED STATES PATENT AND TRADEMARK OFFICE
CERTIFICATE OF CORRECTION

PATENT NO.     : 6,467,360 B1
DATED          : October 22, 2002
INVENTOR(S)    : Leonid Bogdanov It is certified that error appears in the above-identified patent and that said Letters Patent is hereby corrected as shown below:

<u>Column 8,</u>
Line 43, delete "magnetized said" and insert -- said magnetized --.

<u>Column 9,</u>
Line 22, delete "magnetized said" and insert -- said magnetized --.

<u>Column 10,</u>
Line 10, delete "magnetized said" and insert -- said magnetized --.

Signed and Sealed this

Eighteenth Day of November, 2003

JAMES E. ROGAN
*Director of the United States Patent and Trademark Office*